(12) United States Patent
Hight et al.

(10) Patent No.: US 11,467,924 B2
(45) Date of Patent: Oct. 11, 2022

(54) INSTANT RECOVERY OF DATABASES

(71) Applicant: Rubrik, Inc., Palo Alto, CA (US)

(72) Inventors: Joshua Duncan Hight, San Francisco, CA (US); Jiangbin Luo, Palo Alto, CA (US); Christopher Wong, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 224 days.

(21) Appl. No.: 16/520,665

(22) Filed: Jul. 24, 2019

(65) Prior Publication Data

US 2020/0042407 A1 Feb. 6, 2020

Related U.S. Application Data

(60) Provisional application No. 62/712,785, filed on Jul. 31, 2018.

(51) Int. Cl.
*G06F 11/14* (2006.01)

(52) U.S. Cl.
CPC ...... *G06F 11/1469* (2013.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 7,640,408 B1* | 12/2009 | Halligan | ............. | G06F 11/1466 711/162 |
| 2010/0115332 A1* | 5/2010 | Zheng | ................. | G06F 11/1466 714/6.2 |
| 2010/0198788 A1* | 8/2010 | Sim-Tang | ........... | G06F 11/2082 707/634 |
| 2012/0324280 A1* | 12/2012 | Wang | ................... | G06F 11/1417 714/15 |
| 2015/0278032 A1* | 10/2015 | Shvechkov | ......... | G06F 11/1441 711/162 |
| 2018/0285201 A1* | 10/2018 | Bangalore | ............... | G06F 16/27 |
| 2018/0321848 A1* | 11/2018 | Brown | ................ | G06F 11/1402 |

* cited by examiner

*Primary Examiner* — Eddy Cheung
(74) *Attorney, Agent, or Firm* — Holland & Hart LLP

(57) ABSTRACT

An example method of restoring a database includes obtaining information about backup data of a database from a source storage separate from a compute infrastructure. The information includes a list of data blocks of a file, transferring the data blocks on the list from the source storage to a local storage on the compute infrastructure, and tracking which data blocks of the file have been transferred from the source storage to the local storage concurrently when transferring the data blocks.

20 Claims, 9 Drawing Sheets

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
|  | ... |  |

FIG. 3A

Job Queue 224

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | ... |

Image Table 228

| im_id | im_location |
|---|---|
| m001.im1 | ... |
| m001.im1-2 | |
| m001.im2-3 | |
| m001.im3-4 | |
| m001.im4-5 | |

FIG. 3C

VIRTUALIZATION LAYER

Virtualized Infrastructure Manager 499

Virtual Machine 498

Guest OS 496

Applications 497

Virtual Processor 492

Virtual Memory 494

Virtual Disk 495

HYPERVISOR LAYER

Hypervisor 486

HARDWARE LAYER

Processor 482

Memory 484

Disk 485

FIG. 4

INSTANT RECOVERY OF DATABASES

CLAIM OF PRIORITY

This application claims the benefit of priority, under 35 U.S.C. Section 119(e), to Wang, of U.S. Provisional Application No. 62/712,785, entitled "Instant Recovery of Databases," filed Jul. 31, 2018, which is hereby incorporated by reference in its entirety.

TECHNICAL FIELD

The present invention generally relates to managing and storing data, for example for backup purposes.

BACKGROUND INFORMATION

The amount and type of data that is collected, analyzed, and stored is increasing rapidly over time. The compute infrastructure used to handle this data is also becoming more complex, with more processing power and more portability. As a result, data management and storage are increasingly important. One aspect of this is reliable data backup and storage, and fast data recovery in cases of failure. However, during restoration or recovery, database downtime is often inevitable, which results in losses and poor user experiences.

SUMMARY

To restore databases using backup data, data blocks or files are transferred gradually from a source system where the backup data is stored to a destination system. Transfer of the data blocks or files is tracked and used to direct access to the data blocks or files by various applications. If a data block or a file is resident on the destination system, a read operation to access the data block or file is directed to the destination system. However, if a data block or a file is not resident on the destination system, a read operation to access the data block or file is directed to the source system. Write operations are directed to the destination system. In various embodiments, a bitmap is used to track the transfer of data blocks or files.

In some embodiments, a system comprises processors; and a memory storing machine-readable instructions that, when executed by at least one processor among the processors, cause the system to perform operations comprising, at least: obtaining information about backup data of a database from a source storage separate from a compute infrastructure, the information including a list of data blocks of a file; transferring the data blocks on the list from the source storage to a local storage on the compute infrastructure; tracking which data blocks of the file have been transferred from the source storage to the local storage concurrently when transferring the data blocks; and in response to receiving a read command to a first data block: responsive to determining that the first data block has been transferred onto the local storage based on the tracking, reading the first data block from the local storage, and responsive to determining that the first data block is resident on the source storage based on the tracking, reading the first data block from the source storage; and in response to receiving a write command: writing a second data block onto the local storage.

In some examples, transferring the data blocks and tracking which data blocks have been transferred are performed by running a file system in kernel mode on the compute infrastructure.

In some examples, the read command is issued by an application, further comprising intercepting the read command by reading the first data block from the local storage or from the source storage.

In some examples, the tracking data comprises a bitmap of bits, each bit representing one of the data blocks and indicating whether that data block has been transferred.

In some examples, a size of the data block represented by each bit is configurable.

In some examples, operations further comprise storing the bitmap in kernel space memory.

In some examples, the backup data is stored in a data management and storage (DMS) system including a DMS cluster of peer DMS nodes, a distributed data store implemented across the peer DMS nodes, and wherein the distributed data storage is the source storage.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIGS. 2A through 2B, according to one embodiment.

FIG. 4 is a block diagram of a virtual machine, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
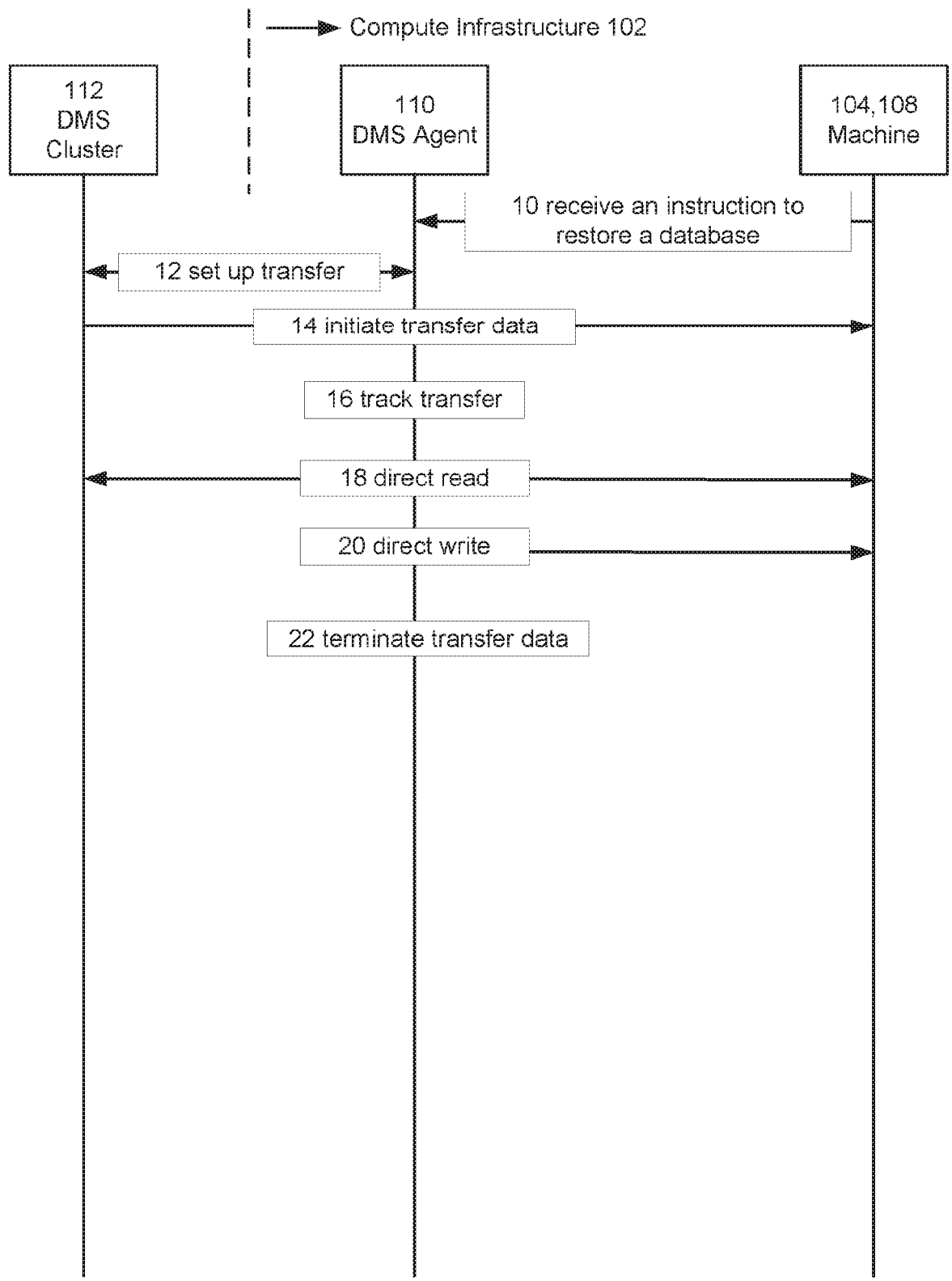
FIG. 1 is an event trace illustrating restoring databases from data backup, according to one embodiment.

FIG. 1 is an event trace illustrating restoring databases from data backup, according to one embodiment. Each box at the top of the figure represents a component from FIG. 2A: the data management and storage (DMS) cluster 112, the various machines 104,108, and the DMS agent 110. The machines 104,108, and the DMS agent 110 are parts of the compute infrastructure 102. The machines 104,108 are managed by the DMS cluster 112. In particular, the DMS cluster 112 provides backup services to the compute infrastructure 102. As part of the backup process, the DMS cluster 112 pulls snapshots from the machines 104,108. The snapshots can be full including all data stored on the machines 104, 108; or incremental including only changes from the prior snapshot. The vertical lines extending downward from each box represent that component's activities over time, with time moving forward from the top to the bottom of the figure.

The DMS agent 110 can intercept data block or file commands (e.g., write, read) issued by various applications running on the machines 104,108. The data block or file commands access data blocks or files that are stored in relational or non-relational databases. The DMS agent 110 includes a module (not shown) running in a kernel model. The DMS agent 110 also tracks which data blocks or files have been loaded onto a machine 104 (108) from the DMS cluster 112. That is, the DMS agent 110 tracks whether a data block or file is present on a machine 104 (108). The DMS agent 110 may further include a module that runs in a user mode. The DMS agent 110 can interact with the DMS cluster 112 to capture snapshots of the machines 104,108, to load backup data stored in the DMS cluster 112 onto the machines 104,108. In some embodiments, the DMS agent 110 may install a file system filter that intercepts data block reads and data block writes. The file system filter is supported by the file system that the database uses.

The DMS agent 110 is instructed 10 to restore a database on a machine 104 (or 108). As illustrated, the DMS agent 110 receives the instruction from the machine 104 (or 108). For example, the instruction is issued from an application running on the machine 104 (or 108). The application receives an instruction from the user to restore the database. The DMS agent 110 may also receive an instruction directly from a user. Alternatively, the instruction can be received from the DMS cluster 112. A user can interface with the DMS cluster 112 to instruct to load data blocks onto the machine 104 (or 108). The database can be restored by using the data stored on the DMS cluster 112.

The DMS agent 110 and the DMS cluster 112 set up 12 transferring data blocks or files from the DMS cluster 112 to the machine 104 (or 108). The data blocks or files are used to restore the database. For example, the DMS cluster 112 identifies the data blocks or files that are requested and creates a list of the data blocks or files requested. The list may also include the address on the DMS cluster 112 where the data blocks or files are stored. The DMS cluster 112 provides the list to the DMS agent 110.

The DMS agent 110 and the DMS cluster 112 initiate transfer 14 the data blocks or files from the DMS cluster 112 to the machine 104 (or 108.) To transfer a data block or file, the DMS agent 110 obtains the data block or file on the list and stores the data block or file into the local storage on the machine 104 (or 108). The DMS agent 110 can transfer multiple data blocks or files at once. The DMS agent 110 repeats the transfer process for all data blocks on the list over time until all the data blocks are transferred from the DMS cluster 112 onto the machine 104 (or 108).

The DMS agent 110 tracks 16 the transfer of the data blocks or files from the DMS cluster 112 to the machine 104 (or 108). In one implementation, the tracking is accomplished by the module running in kernel mode. The DMS agent 110 uses bitmaps to manage tracking of the data blocks. Each bit in the bitmap represents a data block in a file and indicates whether that data block has been transferred from the DMS cluster 112 to the machine 104 (or 108). In one implementation, the bitmap contains an array of small bitmaps of the same size. A small bitmap corresponds to a small segment of a file and a bit corresponds to a data block. The bitmap can be created during runtime based on the transfer status of the segment of the file. If a data block is located in a small segment of a file for which there is no corresponding small bitmap, a small bitmap is created for that segment and added to the array. In some embodiments, all bits of a small bitmap are set to 0 when initialized. The bit corresponding to that individual data block is set to 1 if that data block is transferred. The DMS agent 110 may use tracking sessions to track transfer of the data blocks or files. The DMS agent 110 can maintain more than more active sessions at a given time. For each session, the DMS agent 110 maintains a list of the files and a bitmap for each file in the session. For example, a bitmap for a file is an array of small bitmaps corresponding to small segments of the file. A small bitmap is not initialized until one bit of the small bitmap must be set to 1. This allows the bitmap to be resizable and can represent changes to very large files very efficiently.

While the data blocks or files are being transferred, if an application on the machine 104 (or 108) issues commands to access a data block, the DMS agent 110 uses the tracking information to determine how to direct the commands during the restoration to minimize or eliminate any downtime. That is, applications that issue commands to access a database that is being restored can still access the database during the process of restoring the database on the machine 104 (or 108).

During restoration, the DMS agent 110 directs 18 read operations onto the local storage of the machine 104 (or 108) if the data block is resident on the machine 104 (or 108), and onto the DMS cluster 112 if the data block is not resident on the machine 104 (or 108). Whether a data block is resident on the local storage can be determined by using the tracking information such as a bitmap. The DMS agent 110 may modify the destination of the read command issued by the application to the destination on the local storage or on the DMS cluster. The filesystem can therefore obtain and provide the data block to the application. If a data block is read from the DMS cluster 112, the data block is written onto the machine 104 (or 108) before being returned to the application. Writing the data block onto the machine 104 (or 108) can be performed concurrently with or after returning the data to the application.

During restoration, the DMS agent 110 directs 20 all write operations on the local storage of the machine 104 (or 108) during the transfer. For example, the DMS agent 110 modifies the destination of the write command issued by the application to a destination on the local storage such that the data is written into the local storage. For a write operation, the DMS agent 110 updates the bitmap corresponding to the file by marking the bits for all data blocks that would be changed by the write operation after the operating system has received the request but before writing the data into the local storage.

The DMS agent 110 terminates 22 the data transfer after all data blocks are transferred from the DMS cluster 112 to the machine 104 (108).

Figure 2A:
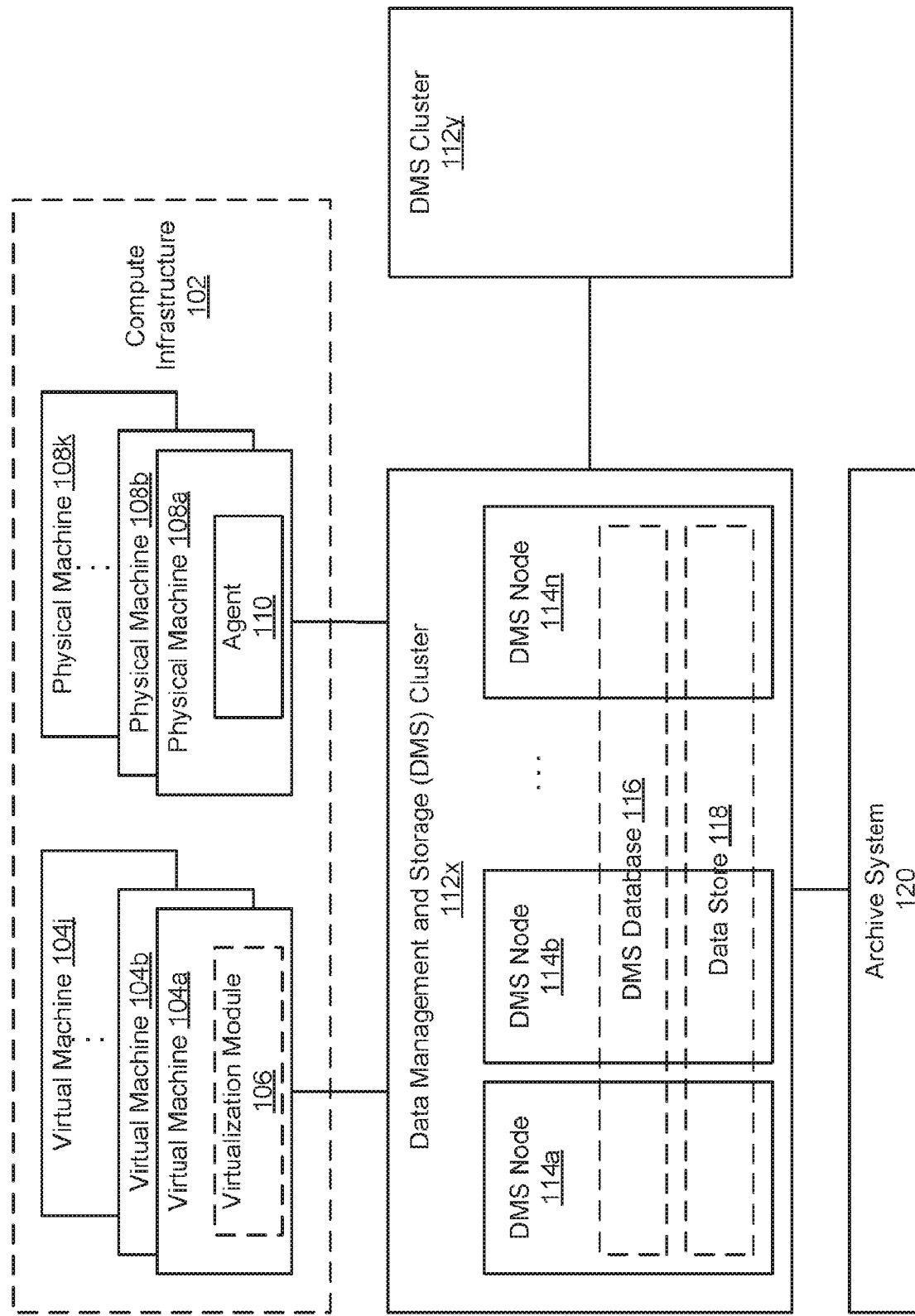
FIG. 2A is a block diagram of a system for managing and storing data, according to one embodiment.

FIGS. 2A through 3C provide an example DMS system that implements the approach described above. FIG. 2A is a block diagram illustrating a DMS system, according to one embodiment. In this example, the system includes a DMS cluster 112x, a secondary DMS cluster 112y and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. Additional examples include web servers (Linux), intranet servers (Linux), Exchange servers (Windows), MS SQL databases (MS SQL), and NAS systems (NFS). The compute infrastructure can include production environments, in addition to development or other environments.

In this example, the compute infrastructure 102 includes both virtual machines (VMs) 104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples.

The DMS cluster 112 manages and stores data for the compute infrastructure 102. This can include the states of machines 104,108, configuration settings of machines 104,108, network configuration of machines 104,108, and data stored on machines 104,108. Example DMS services includes backup, recovery, replication, archival, and analytics services. The primary DMS cluster 112x enables near instant recovery of backup data. Derivative workloads (e.g., estimating the Pr(change) or otherwise determining which data blocks should be tagged for automatic transfer) may also use the DMS clusters 112x, 112y as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time is required to retrieve data stored in archive system 120. In contrast, the DMS clusters 112 provide much faster backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114, but interacts with the DMS nodes 114a-n collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, such as the tags for automatic transfer, as will be described in more detail in FIG. 2. In the following examples, these are shown as tables but other data structures could also be used. The data store 118 contains the actual backup data from the compute infrastructure 102, for example the data blocks for snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, a DMS agent 110 is installed on the physical machines 108 to facilitate DMS services for the physical machines. DMS agents 110 may also be installed on VMs 104, but for convenience they are not shown in the figures.

Figure 2B:
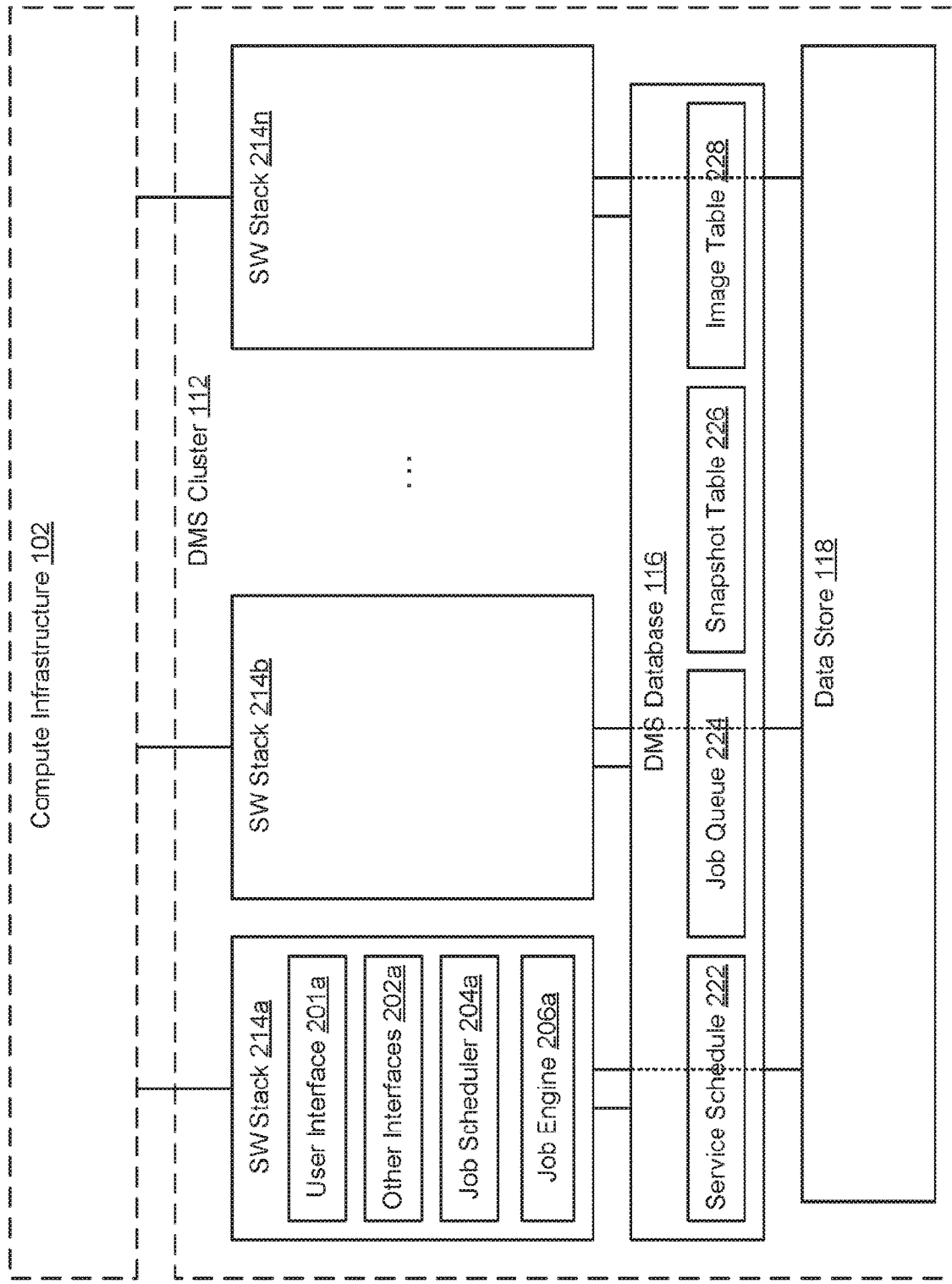
FIG. 2B is a logical block diagram of a data management and storage (DMS) cluster, according to one embodiment.

FIG. 2B is a logical block diagram illustrating an example DMS cluster 112, according to one embodiment. This logical view shows the software stack 214a-n for each of the DMS nodes 114a-n of FIG. 2A. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the DMS agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc. More details of example implementations are provided in FIG. 3 below.

DMS database 116 also stores metadata information for the data in the data store 118. The metadata information may include file names, file sizes, permissions for files, and various times such as when the file was created or last modified.

FIG. 3 illustrate operation of the DMS system shown in FIG. 2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.
Replication policy: The backups on the primary DMS cluster for the prior 1 days must also be replicated on the secondary DMS cluster 112y.
Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start_time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

In FIG. 3C, the snapshots and images are each represented by a single name: m001.ss1, m001.im1-2, etc. Each of these is composed of data blocks. The incremental image m001.im1-2 is constructed by comparing corresponding data blocks of snapshots m001.ss1 and m001_ss2. However, the data blocks for the previous snapshot m001.ss1 are stored in the data store 118 while the data blocks for the current snapshot exist in the compute infrastructure 102. In order to compare data blocks, either the m001.ss1 data blocks are transferred to the compute infrastructure 102 or the m001_ss2 data blocks are transferred to the DMS cluster 112. The latter is preferred because the DMS cluster's primary purpose is to provide DMS services and because any resulting incremental images will be stored at the DMS cluster. In addition, because the compute infrastructure 102 serves some other primary purpose, it is preferred to reduce the burden on the compute infrastructure 102. However, transferring all the data blocks from the compute infrastructure 102 to the DMS cluster 112 is an inefficient use of network bandwidth if not all of the data blocks have changed. Hence, the approach described above may be applied to both reduce the bandwidth used to transfer data blocks from the compute infrastructure 102 to the DMS cluster 112 and to reduce the computing power used at the compute infrastructure 102 to calculate digital fingerprints.

FIG. 4 is a block diagram of a server for a VM platform, according to one embodiment. The server includes hardware-level components and software-level components. The hardware-level components include one or more processors 482, one or more memory 484, and one or more storage devices 485. The software-level components include a hypervisor 486, a virtualized infrastructure manager 499, and one or more virtual machines 498. The hypervisor 486 may be a native hypervisor or a hosted hypervisor. The hypervisor 486 may provide a virtual operating platform for running one or more virtual machines 498. Virtual machine 498 includes a virtual processor 492, a virtual memory 494, and a virtual disk 495. The virtual disk 495 may comprise a file stored within the physical disks 485. In one example, a virtual machine may include multiple virtual disks, with each virtual disk associated with a different file stored on the physical disks 485. Virtual machine 498 may include a guest operating system 496 that runs one or more applications, such as application 497. Different virtual machines may run different operating systems. The virtual machine 498 may load and execute an operating system 496 and applications 497 from the virtual memory 494. The operating system 496 and applications 497 used by the virtual machine 498 may be stored using the virtual disk 495. The virtual machine 498 may be stored as a set of files including (a) a virtual disk file for storing the contents of a virtual disk and (b) a virtual machine configuration file for storing configuration settings for the virtual machine. The configuration settings may include the number of virtual processors 492 (e.g., four virtual CPUs), the size of a virtual memory 494, and the size of a virtual disk 495 (e.g., a 10 GB virtual disk) for the virtual machine 495.

The virtualized infrastructure manager 499 may run on a virtual machine or natively on the server. The virtualized infrastructure manager 499 corresponds to the virtualization module 106 above and may provide a centralized platform for managing a virtualized infrastructure that includes a plurality of virtual machines. The virtualized infrastructure manager 499 may manage the provisioning of virtual machines running within the virtualized infrastructure and provide an interface to computing devices interacting with the virtualized infrastructure. The virtualized infrastructure manager 499 may perform various virtualized infrastructure related tasks, such as cloning virtual machines, creating new virtual machines, monitoring the state of virtual machines, and facilitating backups of virtual machines.

For virtual machines, taking a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

Figure 5:
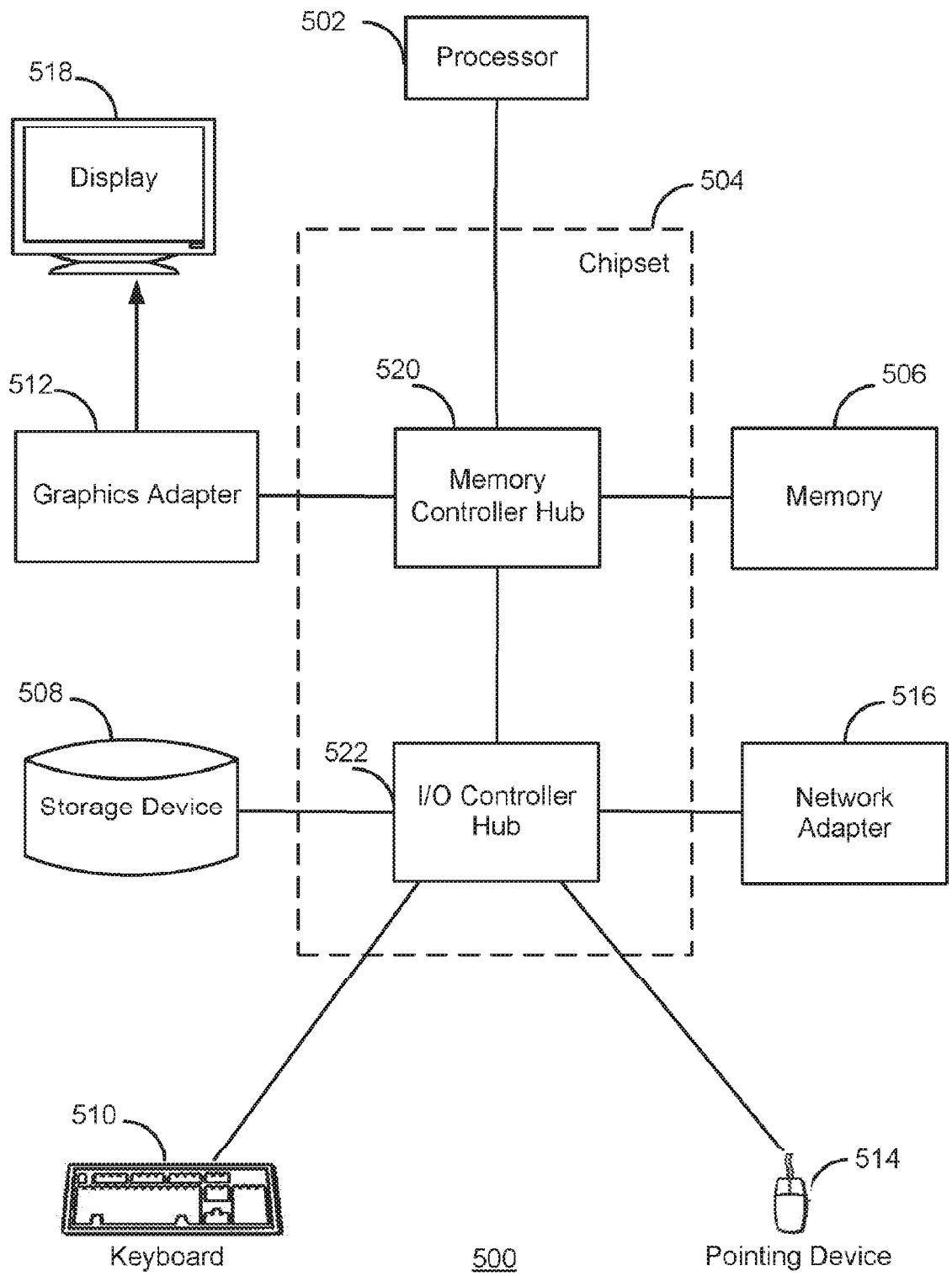
FIG. 5 is a block diagram of a computer system suitable for use in a DMS system, according to one embodiment.

FIG. 5 is a high-level block diagram illustrating an example of a computer system 500 for use as one or more of the components shown above, according to one embodiment. Illustrated are at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display device 518 is coupled to the graphics adapter 512. A storage device 508, keyboard 510, pointing device 514, and network adapter 516 are coupled to the I/O controller hub 522. Other embodiments of the computer 500 have different architectures. For example, the memory 506 is directly coupled to the processor 502 in some embodiments.

The storage device 508 includes one or more non-transitory computer-readable storage media such as a hard drive, compact disk read-only memory (CD-ROM), DVD, or a solid-state memory device. The memory 506 holds instructions and data used by the processor 502. The pointing device 514 is used in combination with the keyboard 510 to input data into the computer system 500. The graphics adapter 512 displays images and other information on the display device 518. In some embodiments, the display device 518 includes a touch screen capability for receiving user input and selections. The network adapter 516 couples the computer system 500 to a network. Some embodiments of the computer 500 have different and/or other components than those shown in FIG. 5. For example, the virtual machine 102, the physical machine 104, and/or the DMS node 114 in FIG. 2A can be formed of multiple blade servers and lack a display device, keyboard, and other components.

The computer 500 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

Figure 6:
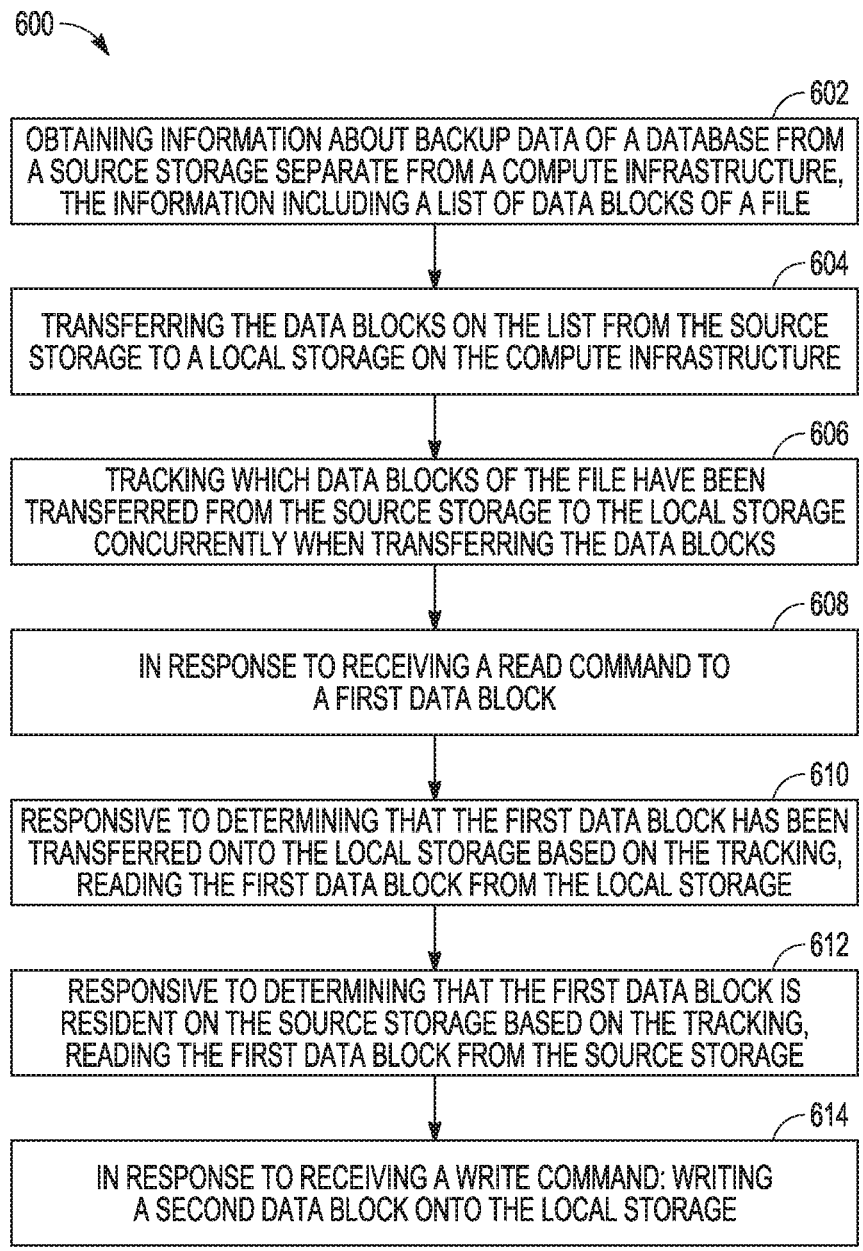
FIG. 6 is a flow chart of example operations in a method, according to an example embodiment.

Some examples of the present disclosure include method embodiments. With reference to FIG. 6, an example method or restoring a database 600 comprises at least the following operations: at 602, obtaining information about backup data of a database from a source storage separate from a compute infrastructure, the information including a list of data blocks of a file; at 604, transferring the data blocks on the list from the source storage to a local storage on the compute infrastructure; at 606, tracking which data blocks of the file have been transferred from the source storage to the local storage concurrently when transferring the data blocks; and, at 608, in response to receiving a read command to a first data block: at 610, responsive to determining that the first data block has been transferred onto the local storage based on the tracking, reading the first data block from the local storage; at 612, responsive to determining that the first data block is resident on the source storage based on the tracking, reading the first data block from the source storage; and, at 614, in response to receiving a write command: writing a second data block onto the local storage.

In some examples, transferring the data blocks and tracking which data blocks have been transferred are performed by running a file system in kernel mode on the compute infrastructure.

In some examples, the read command is issued by an application, further comprising intercepting the read command by reading the first data block from the local storage or from the source storage.

In some examples, the tracking data comprises a bitmap of bits, each bit representing one of the data blocks and indicating whether that data block has been transferred.

In some examples, a size of the data block represented by each bit is configurable.

In some examples, the operations further comprise storing the bitmap in kernel space memory.

In some examples, the backup data is stored in a data management and storage (DMS) system including a DMS cluster of peer DMS nodes, a distributed data store implemented across the peer DMS nodes, and wherein the distributed data storage is the source storage.

Some example embodiments include systems as summarized further above, or specifically described herein, that include processors configured to perform one or more of the method operations summarized above or described herein.

Some example embodiments also include non-transitory machine-readable media that include instructions for performing one or more of the method operations summarized above or described herein.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A method of restoring a database hosted on a virtual machine, comprising:
    initiating a restoration procedure for the database hosted on the virtual machine, wherein data for the database is stored at a local storage on a compute infrastructure running the virtual machine;
    obtaining, as part of the restoration procedure, information about backup data stored for the database on a source storage that is separate from the compute infrastructure, the information including a list of data blocks of a file of the database;
    activating, based at least in part on initiating the restoration procedure, a configuration for determining whether to direct read commands and write commands to the local storage or the source storage;
    transferring, from the source storage to the local storage and during the restoration procedure, the data blocks on the list;
    tracking, during the restoration procedure, which data blocks of the file have been transferred from the source storage to the local storage concurrently with transferring the data blocks;
    receiving, during the restoration procedure, a read command for a first data block of the data blocks and a write command for a second data block of the data blocks;
    determining, based on the receiving, whether the first data block has been transferred to the local storage based on the tracking;
    reading, in response to the read command and during the restoration procedure, the first data block from the local storage based on determining that the first data block has been transferred to the local storage in accordance with the configuration or from the source storage based on determining that the first data block has not been transferred to the local storage in accordance with the configuration; and
        writing, in response to the write command and during the restoration procedure, data for the second data block to the local storage regardless of whether the second data block has been transferred to the local storage in accordance with the configuration.

2. The method of claim 1, wherein transferring the data blocks and tracking which data blocks have been transferred comprises:
   running a file system in kernel mode on the compute infrastructure.

3. The method of claim 1, wherein the read command is issued by an application, the method further comprising:
   intercepting the read command by reading the first data block from the local storage or from the source storage.

4. The method of claim 1, wherein data for tracking which data blocks of the file have been transferred comprises a bitmap of bits, each bit representing one of the data blocks and indicating whether that data block has been transferred.

5. The method of claim 4, wherein a size of the data block represented by each bit is configurable.

6. The method of claim 4, further comprising:
   storing the bitmap in kernel space memory.

7. The method of claim 1, wherein the backup data is stored in a data management and storage (DMS) system including a DMS cluster of peer DMS nodes, a distributed data storage being implemented across the peer DMS nodes, and wherein the distributed data storage is the source storage.

8. A system comprising:
   processors; and
   a memory storing machine-readable instructions executable by at least one processor among the processors to cause the system to:
      initiate a restoration procedure for a database hosted on a virtual machine, wherein data for the database is stored at a local storage on a compute infrastructure running the virtual machine;
      obtain, as part of the restoration procedure, information about backup data stored for the database on a source storage that is separate from the compute infrastructure, the information including a list of data blocks of a file of the database;
      activate, based at least in part on initiating the restoration procedure, a configuration for determining whether to direct read commands and write commands to the local storage or the source storage;
      transfer, from the source storage to the local storage and during the restoration procedure, the data blocks on the list;
      track, during the restoration procedure, which data blocks of the file have been transferred from the source storage to the local storage concurrently with transferring the data blocks;
      receive, during the restoration procedure, a read command for a first data block of the data blocks and a write command for a second data block of the data blocks;
      determine, based on the receiving, whether the first data block has been transferred to the local storage based on the tracking;
      read, in response to the read command and during the restoration procedure, the first data block from the local storage based on determining that the first data block has been transferred to the local storage in accordance with the configuration or from the source storage based on determining that the first data block has not been transferred to the local storage in accordance with the configuration; and
      write, in response to the write command and during the restoration procedure, data for the second data block to the local storage regardless of whether the second data block has been transferred to the local storage in accordance with the configuration.

9. The system of claim 8, wherein, to transfer the data blocks and track which data blocks have been transferred, the machine-readable instructions are further executable by the at least one processor to cause the system to:
   run a file system in kernel mode on the compute infrastructure.

10. The system of claim 8, wherein the read command is issued by an application, and wherein the machine-readable instructions are further executable by the at least one processor to cause the system to:
   intercept the read command by reading the first data block from the local storage or from the source storage.

11. The system of claim 8, wherein data for tracking which data blocks of the file have been transferred comprises a bitmap of bits, each bit representing one of the data blocks and indicating whether that data block has been transferred.

12. The system of claim 11, wherein a size of the data block represented by each bit is configurable.

13. The system of claim 11, wherein the machine-readable instructions are further executable by the at least one processor to cause the system to:
   store the bitmap in kernel space memory.

14. The system of claim 11, wherein the backup data is stored in a data management and storage (DMS) system including a DMS cluster of peer DMS nodes, a distributed data storage being implemented across the peer DMS nodes, and wherein the distributed data storage is the source storage.

15. A non-transitory machine-readable medium including instructions which, when read by a machine, cause the machine to:
   initiate a restoration procedure for a database hosted on a virtual machine, wherein data for the database is stored at a local storage on a compute infrastructure running the virtual machine;
   obtain, as part of the restoration procedure, information about backup data stored for the database on a source storage that is separate from the compute infrastructure, the information including a list of data blocks of a file of the database;
   activate, based at least in part on initiating the restoration procedure, a configuration for determining whether to direct read commands and write commands to the local storage or the source storage;
   transfer, from the source storage to the local storage and during the restoration procedure, the data blocks on the list;
   track, during the restoration procedure, which data blocks of the file have been transferred from the source storage to the local storage concurrently with transferring the data blocks;
   receive, during the restoration procedure, a read command for a first data block of the data blocks and a write command for a second data block of the data blocks;
   determine, based on the receiving, whether the first data block has been transferred to the local storage based on the tracking;
   read, in response to the read command and during the restoration procedure, the first data block from the local storage based on determining that the first data block has been transferred to the local storage in accordance with the configuration or from the source storage based on determining that the first data block has not been transferred to the local storage in accordance with the configuration; and write, in response to the write command and during the restoration procedure, data for the second data block to the local storage regardless of whether the second data block has been transferred to the local storage in accordance with the configuration.

16. The non-transitory, machine-readable medium of claim 15, wherein, to transfer the data blocks and track which data blocks have been transferred, the instructions, when read by the machine further cause the machine to:

run a file system in kernel mode on the compute infrastructure.

17. The non-transitory, machine-readable medium of claim 15, wherein the read command is issued by an application, wherein the instructions, when read by the machine further cause the machine to:

intercept the read command by reading the first data block from the local storage or from the source storage.

18. The non-transitory, machine-readable medium of claim 15, wherein data for tracking which data blocks of the file have been transferred comprises a bitmap of bits, each bit representing one of the data blocks and indicating whether that data block has been transferred.

19. The non-transitory, machine-readable medium of claim 18, wherein a size of the data block represented by each bit is configurable.

20. The non-transitory, machine-readable medium of claim 18, wherein the instructions, when read by the machine, further cause the machine to:

store the bitmap in kernel space memory.

* * * * *